US012791500B2

(12) United States Patent

Murai et al.

(10) Patent No.: US 12,791,500 B2
(45) Date of Patent: Nov. 10, 2026

(54) INSPECTION DEVICE AND INSPECTION METHOD

(71) Applicant: TORAY INDUSTRIES, INC., Tokyo (JP)

(72) Inventors: Takahiro Murai, Otsu (JP); Haruhito Kodama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 193 days.

(21) Appl. No.: 18/850,349

(22) PCT Filed: Mar. 1, 2023

(86) PCT No.: PCT/JP2023/007539
§ 371 (c)(1),
(2) Date: Sep. 24, 2024

(87) PCT Pub. No.: WO2023/189135
PCT Pub. Date: Oct. 5, 2023

(65) Prior Publication Data

US 2025/0224348 A1 Jul. 10, 2025

(30) Foreign Application Priority Data

Mar. 31, 2022 (JP) ................................ 2022-058034

(51) Int. Cl.
*G01N 23/18* (2018.01)
*G01B 15/02* (2006.01)
(Continued)

(52) U.S. Cl.
CPC ........... *G01N 23/18* (2013.01); *G01B 15/025* (2013.01); *G01N 23/083* (2013.01); *G01T 1/2018* (2013.01); *G01N 2223/643* (2013.01)

(58) Field of Classification Search
CPC .... G01B 15/025; G01B 11/06; G01B 11/002; G01B 11/026; G01T 1/2018; G01T 1/20; G01N 23/083; G01N 23/18; G01N 23/04; G01N 2223/643; G01N 23/044; G01N 2223/646; G01N 2223/401; G01N 2223/33; G01N 21/94; G01N 21/892; G01N 21/3581; G01N 2223/3306;
(Continued)

(56) References Cited

U.S. PATENT DOCUMENTS 4,879,752 A * 11/1989 Aune .................... B07C 5/3416 378/54
2010/0310043 A1* 12/2010 Shimada ............. G01N 23/083 378/57

FOREIGN PATENT DOCUMENTS

JP 2008-157821 A 7/2008
JP 2011-191217 A 9/2011
JP 2013-190380 A 9/2013

OTHER PUBLICATIONS

International Search Report issued in corresponding International Patent Application No. PCT/JP2023/007539 dated May 23, 2023.

* cited by examiner

*Primary Examiner* — Irakli Kiknadze
(74) *Attorney, Agent, or Firm* — Morgan, Lewis & Bockius LLP

(57) ABSTRACT

The present disclosure provides an inspection device including a conveyance mechanism; a radiation source; a detector; a movement mechanism; and a determination means. The present disclosure also proposes using the device to inspect foreign matter in the sample.

13 Claims, 8 Drawing Sheets

(51) Int. Cl.
*G01N 23/083* (2018.01)
*G01T 1/20* (2006.01)

(58) Field of Classification Search
CPC ............. G01N 2223/505; G01N 23/16; G01N 2223/03; G01N 2223/652; G01N 23/043; G01N 2223/50; G01N 2223/04; G01N 2223/40; G01N 2223/61; G01N 2223/623; G01N 2223/642; G01N 2223/645; G01N 2223/66; B65B 57/00; B65B 57/10; B65B 61/06; B65B 9/04; B65B 9/045; B65B 61/065; B07C 5/3416; H01M 50/417; G01V 5/22; Y02E 60/10; G01S 17/08
USPC .......................................... 378/54, 57, 58, 62
See application file for complete search history.

INSPECTION DEVICE AND INSPECTION METHOD

TECHNICAL FIELD

The present invention relates to an inspection device and an inspection method for inspecting minute defects and the like in an inspection object (hereinafter referred to as a "sample" in some cases).

BACKGROUND ART

Generally, foreign matter such as minute metal, defects, and the like in a sample are inspected using an inspection method suitable for each. In non-destructive inspection, for example, a sample is irradiated with electromagnetic waves, such as X-rays, to detect the transmitted electromagnetic waves. At this time, a difference in the transmittance of the electromagnetic waves occurs depending on the presence or absence of foreign matter or defects in the sample, the material, or the like. By detecting the difference and generating a two-dimensional image, the internal condition of the sample can be inspected.

Inline inspection, in which inspection is simultaneously performed while manufacturing is performed in a flow operation, is known as a useful means for reducing takt time. For example, there is known a device in which, when an X-ray inspection device is used to detect foreign matter and the like in a sample, and inline inspection is performed, an X-ray source and an X-ray detector with linearly arranged pixels are disposed facing each other to sandwich the surface on which the sample is placed, in a straight line substantially orthogonal to the surface, as the sample is moved in a predetermined direction by a conveyance means. With this device, image data can be acquired at a cycle corresponding to the conveyance speed of the sample, and linear X-ray transmission images generated based on the image data can be sequentially arrayed and composed to generate a two-dimensional image of the sample (cf. Patent Document 1).

PRIOR ART DOCUMENT

Patent Documents

Patent Document 1: Japanese Patent Laid-open Publication No. 2015-64336
Patent Document 2: Japanese Patent Laid-open Publication No. 2020-3322
Patent Document 3: Japanese Patent Laid-open Publication No. 2020-143922
Patent Document 4: Japanese Patent Laid-open Publication No. 2000-221144

SUMMARY OF THE INVENTION

Problems to be Solved by the Invention

In the inline inspection process described above, an inspection device and an inspection method capable of accurately inspecting minute defects with high resolution in a short time are desired. As for inline inspection using electromagnetic waves such as X-rays, a method has been proposed in which a radiation source and a detector are fixed, a sample is conveyed therebetween, and inspection is performed, as shown in Patent Documents 1, 2, and 3. However, when a plurality of defects overlaps in a line connecting the X-ray and the detector, the defects may be detected as a single defect, and defect information such as the number, size, and position of the defects may become inaccurate, leading to erroneous quality determination.

Although a higher conveyance speed of the sample is desirable for enhancing productivity, a high-speed scan rate detector capable of performing high-speed signal processing is required to obtain good images. In Patent Document 2, a technique of sharing the way to read data from a detection element of the detector is used to support high-speed inspection. However, when an image is acquired at high speed, information can only be acquired in a short time, and the amount of electromagnetic waves per output is small, resulting in a dark image with a low signal-to-noise ratio (S/N). Patent Document 3 proposes that a determination region is set in advance, and data is transferred and processed only for pixels corresponding to the region. However, even if these techniques are used, there is a limit in achieving both the high sample conveyance speed and the high sensitivity. The requirements on the detector become more stringent with the increase in the sample conveyance speed and the accuracy pursued in the inspection image. Furthermore, in the case of X-ray inspection, the condition of the afterglow characteristics of a scintillator, which is a phosphor that converts X-rays into visible light, also becomes more stringent, making it even more difficult to achieve all the high speed, high sensitivity, high S/N, and high resolution.

In Patent Document 4, the detector can follow high-speed conveyance by performing imaging while moving in the traveling direction of the sample, thereby reducing the relative speed difference between the detector and the sample. In practice, when the detector performs imaging while being transferred, image afterimages are reduced, improving temporal resolution. However, in the case of a low-contrast defect where the defect has high transmittance to electromagnetic waves and is difficult to differentiate from the surrounding normal portion, detecting the defect is difficult. When the sample conveyance speed is further increased, the entire image becomes darker, and noise, which is the roughness of the image, worsens relative to the overall brightness; that is, the S/N becomes lower. Therefore, detecting a low-contrast defect becomes even more difficult. Although there is a method of increasing the exposure time to brighten the image, this results in a decrease in temporal resolution, resulting in a trade-off between temporal resolution and S/N.

In view of the above problems, an object of the present invention is to provide an inspection device capable of inspecting a sample conveyed at high speed with high resolution, high sensitivity, high S/N, and high accuracy.

Solutions to the Problems

An inspection device of the present invention that solves the above problems includes at least: a conveyance mechanism that conveys a sample to be inspected; a radiation source that radially irradiates a region through which the conveyed sample passes with radiation; a detector that is disposed to be able to detect radiation transmitted through the conveyed sample and converts the detected radiation into an electrical signal; a movement mechanism that moves the detector along a direction in which the sample is conveyed by the conveyance mechanism; and a determination means that determines presence or absence of a defect in the sample based on image information on the sample from the detector obtained during a period when the sample passes through the region, and based on movement information on the sample from the conveyance mechanism. The inspection device is preferably an inspection device in which the conveyance mechanism and the movement mechanism move the sample and the detector such that a ratio Vd/Vw of Vd to Vw is twice or less than a ratio (FDD/FOD) of a distance (FDD) between the radiation source and the detector to a distance (FOD) between the radiation source and the sample, where Vw represents a speed of movement of the sample by the conveyance mechanism, and Vd represents a speed component of movement of the detector by the movement mechanism in the same direction as a movement direction of the sample.

The inspection device is further preferably an inspection device including: a thickness-measuring instrument that measures a thickness of a sample; and a calculation means that calculates a position of a defect in the sample based on thickness information on the sample measured by the thickness-measuring instrument and image information on the sample from the detector.

Effects of the Invention

According to the present invention, it is possible to convey a sample at high speed beyond the restriction on the conveyance speed caused by the scan rate of the detector, providing the effect of obtaining an image with high sensitivity, high S/N, and high resolution and inspecting minute defects with high accuracy.

EMBODIMENTS OF THE INVENTION

The present invention will be described below with reference to the drawings, using an inspection with an X-ray generator as a radiation source as an example. However, specific examples described below illustrate and describe one embodiment of the present invention, and the present invention is not to be construed as being limited to these specific examples. For example, it can be easily understood that the present invention is applicable to another radiation source as long as the radiation source can transmit a sample. It is evident that the specific examples described below can be modified and implemented without departing from the spirit of the present invention.

As the most typical example, an example will be described where, while the sample is conveyed, the radiation source and the detector are disposed across the sample conveyance surface, and the sample conveyance surface is parallel to the detector movement line. Here, the distance between the X-ray focal point, which is the divergence point of the X-ray beam, and the detector when the distance becomes the shortest is referred to as the focus-to-detector distance (FDD), and the distance between the X-ray focal point and the sample when the distance becomes the shortest is referred to as the focus-to-object distance (FOD) (cf. FIG. 5).

<Inspection Device>

Figure 1:
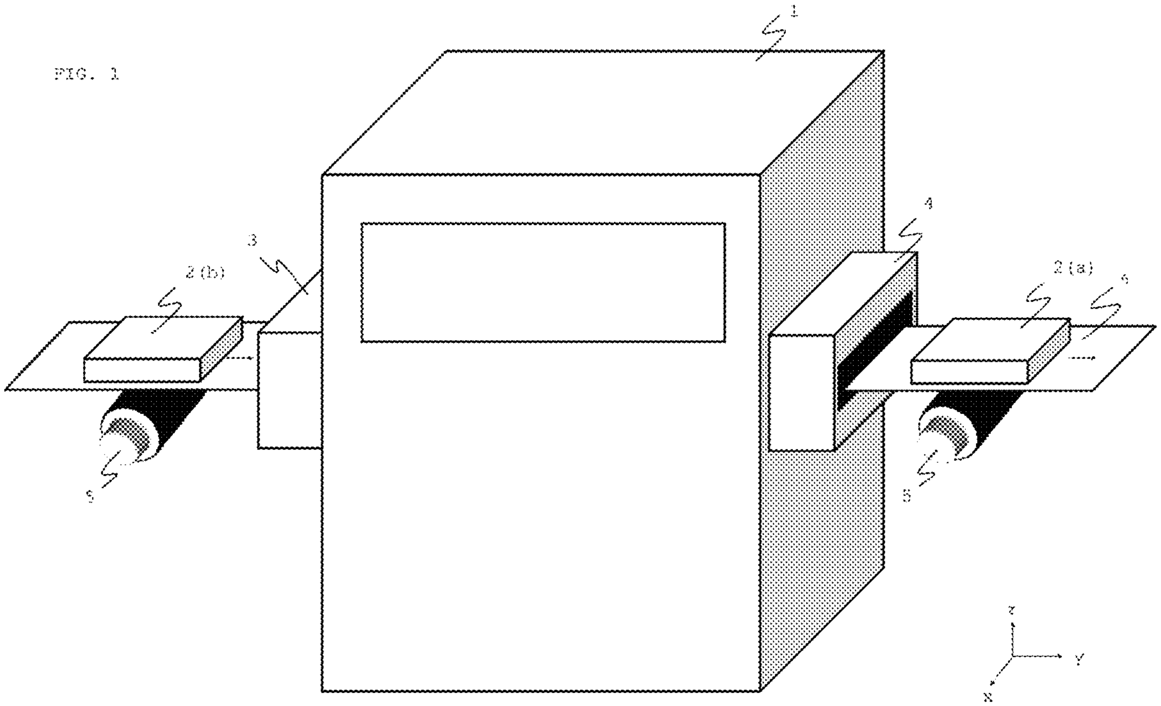
FIG. 1 is a schematic view showing a schematic configuration for explaining one embodiment of the present invention.
Figure 2:
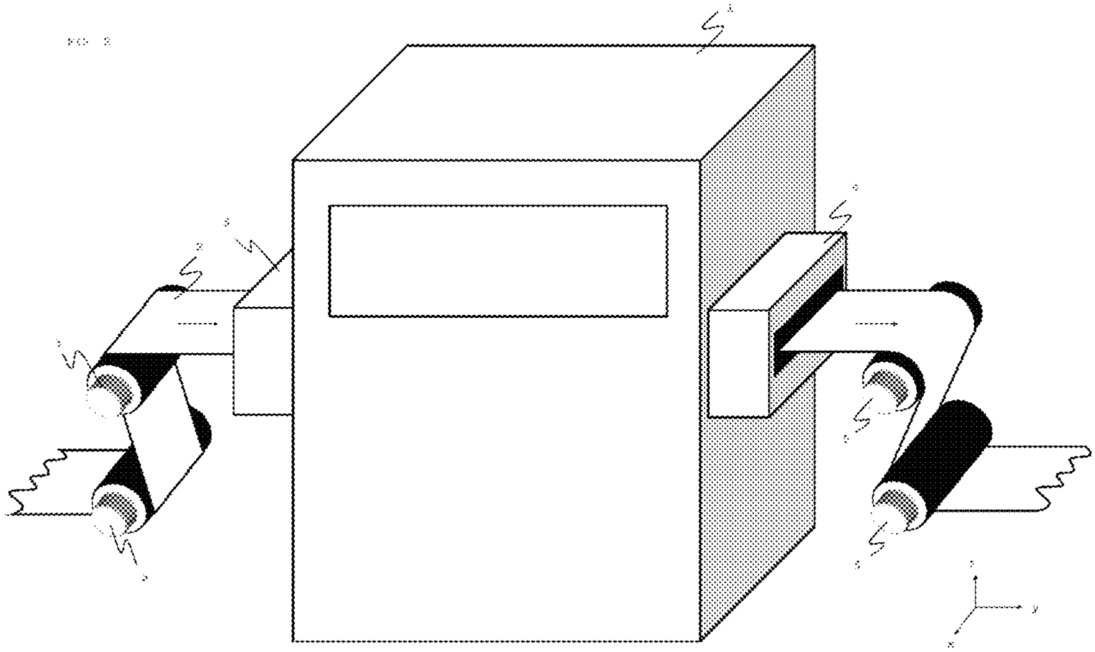
FIG. 2 is a schematic view showing a schematic configuration for explaining one embodiment of the present invention.

FIGS. 1 and 2 are schematic views showing a schematic configuration for explaining one aspect of an inspection device of the present invention. FIG. 1 shows the case of an inline inspection device in which a sample is conveyed in a sheet form, and FIG. 2 shows the case of an inline inspection device for a roll-to-roll continuous film, sheet, or the like. The inspection device is equipped with a housing 1. The housing 1 includes a carry-in port 3 for a sample to be carried in and a carry-out port 4 for a sample to be carried out. When ionizing radiation such as X-rays is used as the radiation source, for the safety of an operator, each of the housing 1, the carry-in port 3, and the carry-out port 4 is usually equipped with a shielding wall capable of shielding the ionizing radiation, such as lead and stainless steel, on the inner wall, and the opening of the carry-out port 3 is usually equipped with a rubber shielding cover to prevent leakage of ionizing radiation to the outside. In the case of FIG. 1, a sample (sample 2 (*a*) and sample 2 (*b*)) is placed on a sample conveyance belt 6, and the sample conveyance belt 6 moves with a sample conveyance roll 5 to introduce the sample into the housing. In the case of FIG. 2, the sample 2 is brought into contact with the sample conveyance roll 5 and directly conveyed into the housing 1.

Figure 3:
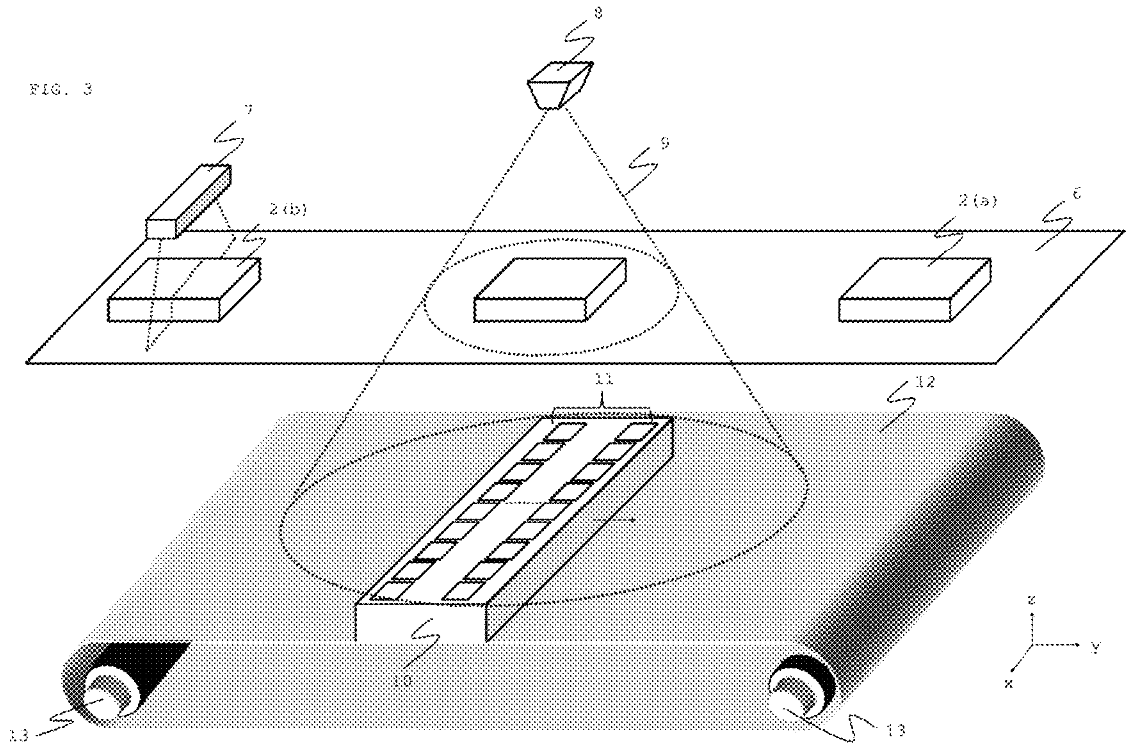
FIG. 3 is a schematic view showing an internal configuration for explaining one embodiment of the present invention.
Figure 4:
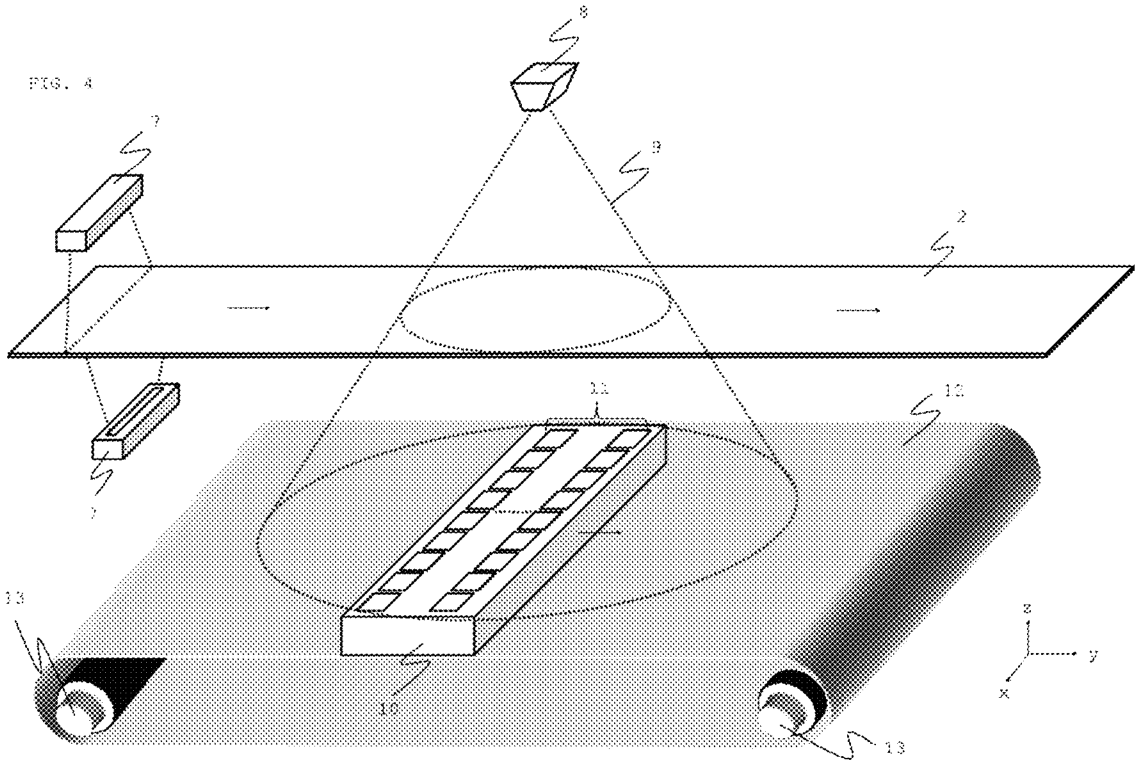
FIG. 4 is a schematic view showing an internal configuration for explaining one embodiment of the present invention.

FIG. 3 is a view schematically showing the inside of FIG. 1, and FIG. 4 is a view schematically showing the inside of FIG. 2. In the case of FIG. 3, the conveyed sample (sample 2 (*a*) and sample 2 (*b*)), a thickness measurement sensor 7 that measures the thickness of the sample, a radiation source 8 that performs irradiation with radiation, and a detector 10 that detects radiation 9 and converts the radiation 9 into an electrical signal are disposed in the housing 1. In this example, the thickness measurement sensor 7 is disposed upstream inside the housing 1, immediately after the sample has passed through the carry-in port 3, and measures the thickness of the sample. A thickness H of each sample carried in is calculated by measuring the height profile of the sample from the surface of the sample conveyance belt 6 using the thickness measurement sensor 7. In the case of FIG. 4, due to the sample having a film shape, the thickness measurement sensors 7 are disposed above and below the sample, and the distance between each of the upper and lower measurement sensors and the sample is measured. Assuming that the distance between the upper measurement sensor and the sample 2 is Ht, the distance between the lower measurement sensor and the sample 2 is Hb, and the distance between the upper and lower measurement sensors is Hd, the thickness H of the sample 2 can be calculated as Hd−Ht−Hb. When radiation is emitted from the radiation source 8, which is a point light source, the radiation spreads radially, and the space irradiated with the radiation is usually conical. Due to the radial irradiation, defects located on the side closer to the radiation source 8 in the sample are imaged as large images in the detector 10, and defects located on the farther side are imaged as small images in the detector 10. When an X-ray source is used as the radiation source 8, an accessory facility such as a high-voltage generator that supplies high-voltage power to the X-ray tube and an X-ray controller that controls tube voltage and tube current is required but is not shown in the figure. The signal (image information) output from the detector 8 is transmitted to an image processing device that processes the signal, which is then processed by a data processing unit (not shown) to make a quality determination. The signal processing unit and the data processing unit can also be housed inside the housing 1.

<Thickness Measurement Sensor>

The thickness measurement sensor 7 is used to accurately obtain the surface position of the sample. As for this sensor, a plurality of sensors may be arranged in a direction where an increase in the number of measurement points is desired, or a single sensor capable of measuring multiple points may be used. The thickness measurement sensor is installed, for example, at a position upstream of the sample conveyance belt, and measurement is performed sequentially as samples are conveyed. As the measuring instrument, a laser triangulation type displacement meter, a laser interferometer, an ultrasonic distance meter, an eddy current type displacement sensor, a stylus type displacement meter, or the like is used. However, the laser triangulation type displacement meter is preferable from the viewpoint of being able to perform measurement in a non-contact manner, being less likely to be affected by the material of the inspection object, being easy to realize a response speed and multipoint measurement, and the like. Specifically, a method called a light-cutting method is preferable, in which a sample is irradiated with linear light generated by a laser light source or the like, and the trajectory of reflected/scattered light according to the surface shape of the sample is acquired as a height profile. The measuring instrument measures the thickness of the sample by reading the position of the trajectory of the light with a light-receiving means such as an image sensor and quantifying the trajectory as the surface shape of the sample surface.

<Radiation Source>

In the inspection device of the present invention, the radiation source is not particularly limited as long as the radiation source can emit radiation transmittable through a sample, but a radiation source that generates an electromagnetic wave is desirable because handling is simple and high measurement accuracy can be expected, and, in particular, an X-ray source is preferably used. The X-ray source that can be used is not particularly limited, and a known X-ray source can be used. As an example, it is preferable to use a micro-focus X-ray tube as the X-ray source, where the size of the X-ray focal point, which is the divergence point of the X-ray beam, is 50 μm or less. The tube voltage of the X-ray tube is not particularly limited. Note that the radiation source may be a radiation source capable of performing irradiation with other types of radiation, such as gamma rays and neutron rays, or electromagnetic waves instead of X-rays, depending on the type of sample, inspection mode, and the like. The radiation source performs radial irradiation from a point light source that is a divergence point.

<Detector>

The detector has a function of detecting radiation emitted from the radiation source and converting the radiation into an electrical signal. There is no particular limitation as long as the element detects the emitted radiation and generates an output according to the detected intensity. Taking the case where the radiation with which the sample is irradiated is X-rays as an example, a detector element of the type described below can be applied: an indirect conversion type detection element that converts X-rays into visible rays using a scintillator and then receives the visible rays with a photodiode to generate an output; or a direct conversion type detection element using a semiconductor such as an amorphous semiconductor (a-Se) or cadmium telluride (CdTe) that converts X-rays directly into an electrical signal to generate an output.

A plurality of detectors may be arranged, and examples of the detectors to use include: a line sensor with elements arranged on a straight line; a time delay integration (TDI) sensor; a detector including a light-receiving element such as a charge-coupled device (CCD) image sensor or a complementary metal-oxide-semiconductor (CMOS) image sensor with elements arranged in a planar shape; and a general-purpose two-dimensional X-ray detector flat-panel detector (FPD). Compared to the direct conversion type detector, the indirect conversion type FPD has no restrictions on usable temperature and the like and is excellent in mechanical strength. Therefore, the indirect conversion type X-ray detector is excellent in handleability. Furthermore, the indirect conversion type FPD preferably includes a cellular scintillator. In the indirect conversion type FPD, a scintillator panel is used to convert radiation into visible light. The scintillator panel includes a phosphor that emits X-rays such as cesium iodide (CsI). The phosphor emits visible light according to the emitted X-rays; the emitted light is converted into an electrical signal by a thin film transistor (TFT), a CCD, or a CMOS; and the electrical signal is transferred, whereby X-ray information can be converted into digital image information. However, in the indirect conversion type FPD, when the phosphor emits light, the sharpness of the image tends to be low due to a cause such as scattering of visible light by the phosphor itself. On the other hand, the FPD employing the adopted cellular scintillator is filled with phosphor in cells partitioned by partition walls, thus making it possible to suppress the effects of visible light scattering. As a result, the FPD including the cellular scintillator has high sharpness and can detect minute defects and defect positions with high accuracy. From the viewpoint that a cellular scintillator with a large area and high sharpness can be easily formed, it is further preferable to use a cellular scintillator prepared by processing a partition wall by photolithography using a photosensitive paste.

In the present invention, it is preferable to use a flexible detector that can be curved and has flexibility. Taking a flat-panel detector as an example, the flexible detector can be obtained by disposing a detection unit with pixels arranged in a matrix on a substrate formed of a bendable flexible resin or the like. In each pixel, for example, a photodiode that allows a current corresponding to the total amount of energy of the received electromagnetic wave to flow, a pixel circuit that controls the driving of the photodiode, and the like are arranged. As a result, an electrical signal corresponding to the total amount of received energy can be output from each pixel to the control unit.

<Movement Mechanism of Detector>

The inspection device of the present invention includes a movement mechanism that moves the detector along the direction in which the sample is conveyed by the conveyance mechanism. Including such a movement mechanism as described later enables inspection with high resolution, high sensitivity, and high S/N even at high speed. The movement mechanism preferably includes an endless annular conveyance belt, and the detector is disposed on this conveyance belt to perform inspection.

As a specific aspect, referring to FIG. 3, in the example of FIG. 3, the movement mechanism for moving the detector is driven by a driving means 13 in the direction in which the sample is conveyed in a conveyance belt 12. To perform imaging while moving the detector 10, stable movement with high constant velocity and straightness is necessary. Therefore, it is preferable to include an auxiliary means that assists smooth movement of the conveyance belt and a buffer means absorbing a tensile force and a compressive force that are generated accompanying movement of the conveyance belt. Examples of these means include a bearing and a damper with a margin capable of absorbing stress. When the detector is moved on the conveyance belt, to prevent wiring cables from the detector, such as a power supply cable for supplying power to the detector and a communication cable for transmitting and receiving signals for acquiring image data, from becoming entangled and making smooth movement difficult, the power supply cable can be connected to an external power cable with a rotary connector, such as a slip ring, that transmits power from the outside to the rotating body. In the communication cable, wireless communication can be used.

In the imaging by the detector, for example, the imaging start timing is set for each row of pixels arranged in a direction (X direction) parallel to the conveyance belt surface and perpendicular to the movement direction of the detector, and image acquisition is started at the timing when a row of a certain pixel enters a region irradiated with radiation from the radiation source, and image acquisition is terminated at the timing when the row becomes out of the irradiation range. Image data during the image acquisition period is temporarily stored in a storage device provided in the detector, and the image data is transmitted to an external receiver when image acquisition is terminated. The timings for the start and end of image acquisition can be known by disposing sensors capable of detecting the passage of the detector upstream and downstream of the irradiation region and detecting the detector.

<Determination Means for Determining Presence or Absence of Defect>

The determination means for determining the presence or absence of a defect includes a means (image information acquisition means, image composition means) that is connected to the detector, acquires the image information on the sample from the detector together with movement information on the sample from the conveyance mechanism, detects a defect present in the sample in the irradiation region, and generates a mapping image in which the position of the defect is specified during the time when the sample is in the irradiation region. The determination means preferably includes a means for acquiring the information from the thickness-measuring instrument and further acquiring information in the sample thickness direction by calculation. The determination means includes a defect candidate detection means for calculating a defect candidate from the acquired image, and a means for determining whether the defect candidate corresponds to the defect.

<Image Information Acquisition Means>

Figure 5:
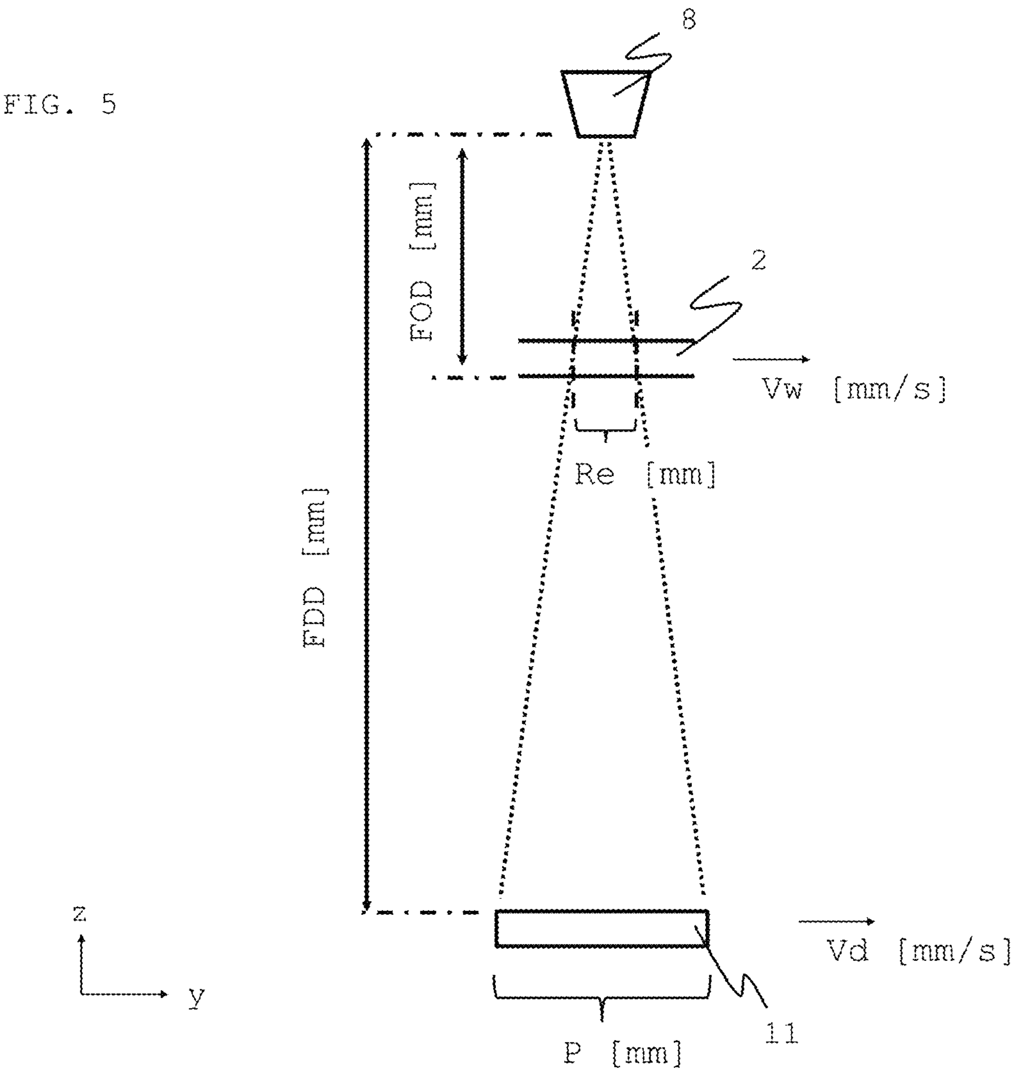
FIG. 5 is a schematic view illustrating an arrangement relationship among a radiation source, a sample, and a detector.
Figure 6:
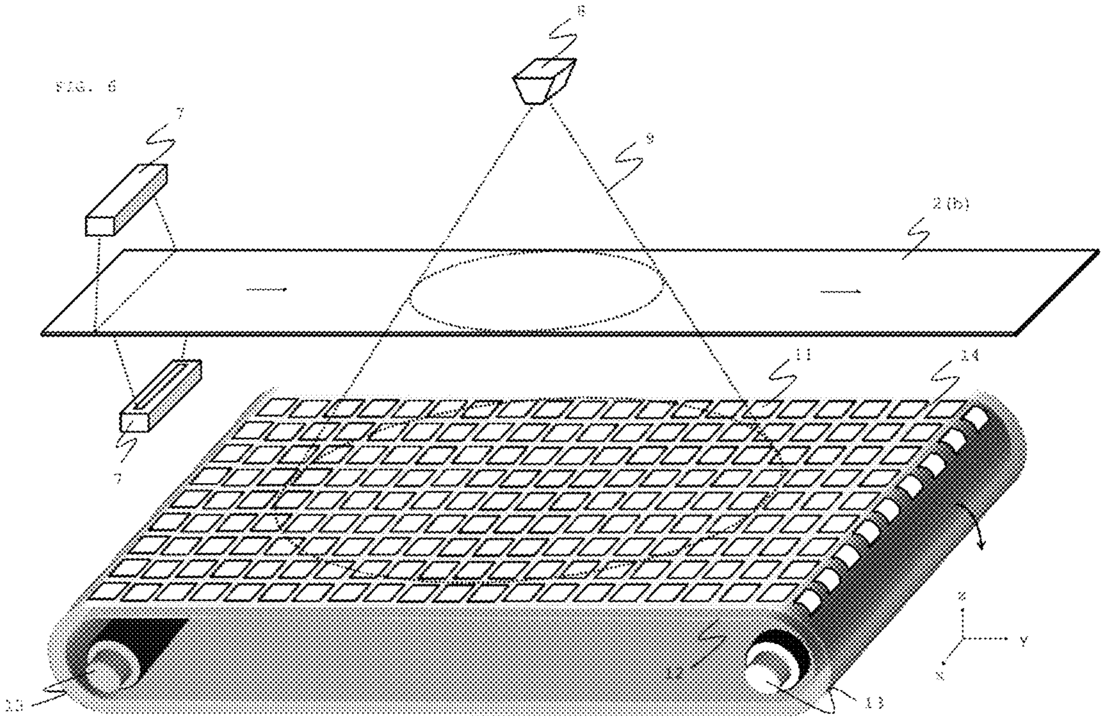
FIG. 6 is a schematic view showing an example in which an endless annular conveyance belt is used as a movement mechanism of a detection unit.

The signal obtained by converting radiation detected by a detector pixel 11 into an electrical signal is output with the intensity of the detected radiation as a luminance value. The luminance value is high (bright) in the pixel with strong detection and the luminance value is small (dark) in the pixel with weak detection. Assuming that the size of the detector pixel 11 is P [mm] and the resolution to be obtained is Re [mm], it is necessary to set a magnification factor M such that Re=P/M, as shown in FIG. 5. In this case, a scan rate f [Hz], which is the number of times of imaging by the detector in one second, has a relationship between time $\tau$ for one imaging and $\tau=1/f$ [sec]. When the conveyance speed of the sample is Vw [mm/sec], the sample is conveyed at Vw [mm/sec] for the length of the resolution Re to be obtained, so that the imaging time $\tau$ required for one imaging by the detector is $\tau=Re/Vw=P/(M\cdot Vw)$ [s]. As the resolution is increased, the detection pixels are decreased, the magnification factor is increased, and the sample conveyance speed is increased, the time $\tau$ required for one imaging becomes shorter, and a detector with a higher scan rate is required. When the detector is moved along the same direction as the sample conveyance direction at a movement speed Vd [mm/sec] of the detector by the movement mechanism of the detector, the detector pixel seems to be moving slower by Vd/M [mm/sec] than the movement speed Vw [mm/sec] of the sample being conveyed. Therefore, the time $\tau$ required for one imaging by the detector 10 is $\tau=Re/|Vw-Vd/M|=P/|M\cdot Vw-Vd|$ [sec], and the time that can be spent for one imaging is longer, enabling even a detector with a low scan rate to operate with high temporal resolution and at a high sample conveyance speed. Conversely, the movement speed of the sample can be increased by increasing $\tau$ allowed for a certain resolution. For example, when imaging is performed with the target resolution Re=0.05 mm, the detector pixel size P=0.1 mm, and the magnification factor=2× at the sample conveyance speed Vw=100 mm/sec, the imaging time is t=0.05/100=0.5 msec (scan rate is 2 kHz) at the detector conveyance speed Vd=0 mm/sec, and imaging can be performed at $\tau=0.05/(100-150/2)=2$ msec (scan rate is 0.5 kHz) at the detector conveyance speed Vd=150 mm/sec. Furthermore, the imaging time can be made as long as possible at the detector conveyance speed Vd=200 mm/sec. On the other hand, at a speed where Vd/M greatly exceeds Vw, the speed difference becomes so large that imaging itself becomes difficult unless the imaging time is shortened. To realize high imaging accuracy and high conveyance speed at a higher level, it is preferable to perform imaging by moving the detector so that the speed ratio Vd/Vw of Vd to Vw is twice or less than the magnification factor M, and it is further preferable to perform imaging by moving the detector so that Vd/Vw is equal to or less than the magnification factor M. As shown in FIG. 6, by using the movement mechanism of the detector for which a flexible detector 14 with bendable flexibility is disposed to move the conveyance belt 12 on which the flexible detector 14 is disposed, a continuous sample, such as a roll-to-roll sample, can be imaged without interruption.

<Image Composition Method>

It is possible to compose an image of the sample at a certain time from the intensity signal from the detector pixel 11 disposed in the detector 10 and the sample position information from the sample conveyance mechanism. When there is a defect in the sample, the defect is recognized as a contrast difference.

Figure 7:
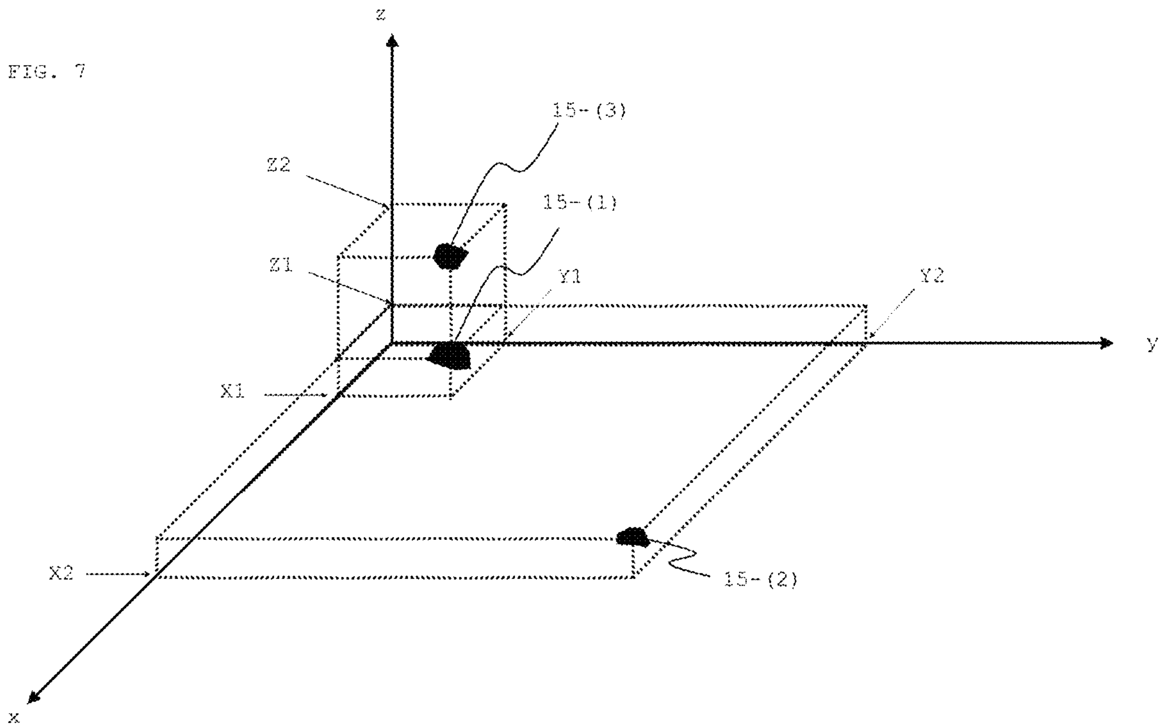
FIG. 7 is a view showing a spatial arrangement example of a defect group.
Figure 8:
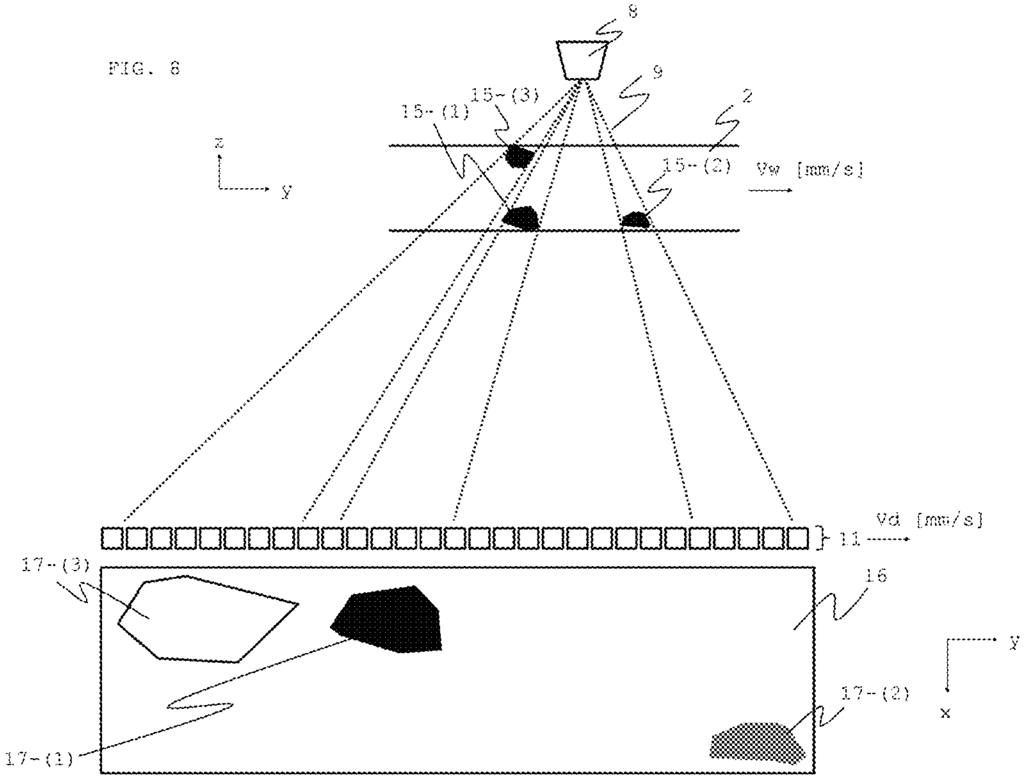
FIG. 8 is an explanatory diagram illustrating imaging at time point ta.
Figure 9:
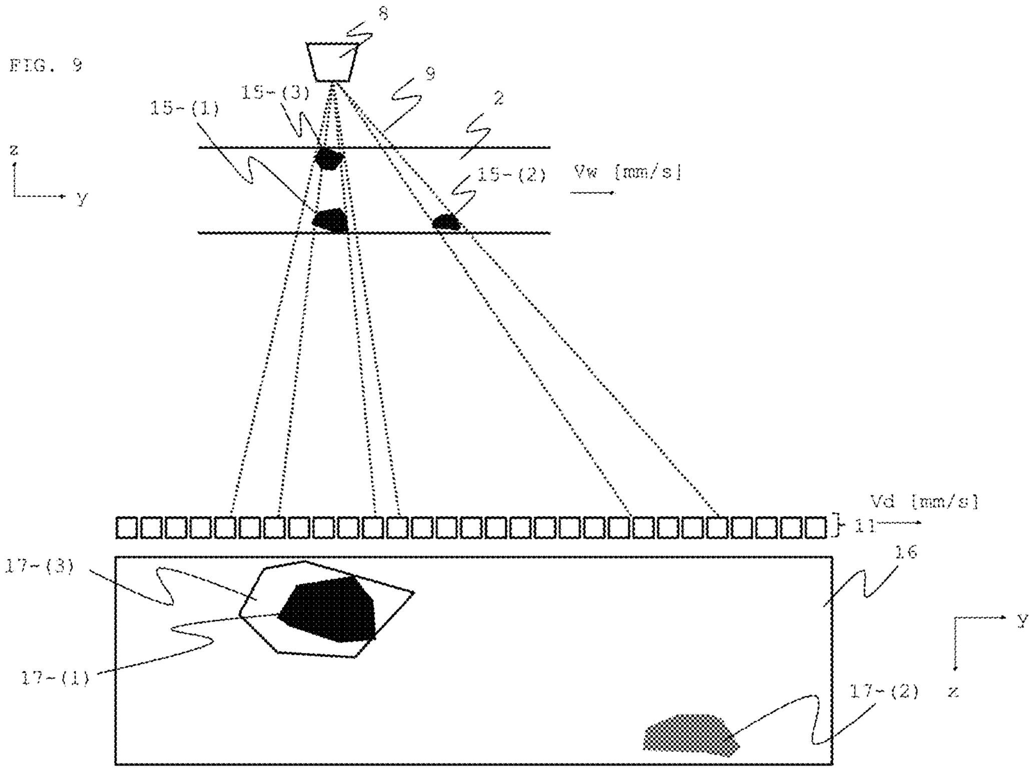
FIG. 9 is an explanatory diagram illustrating imaging at time point tb.
Figure 10:
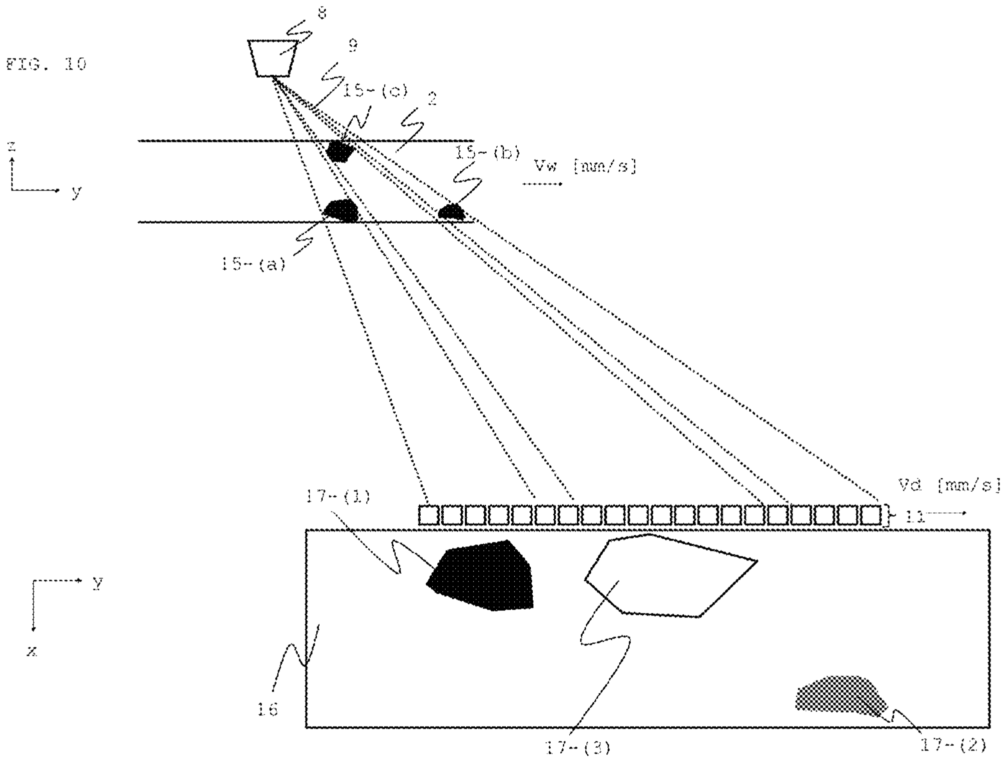
FIG. 10 is an explanatory diagram illustrating imaging at time point tc.
Figure 11:
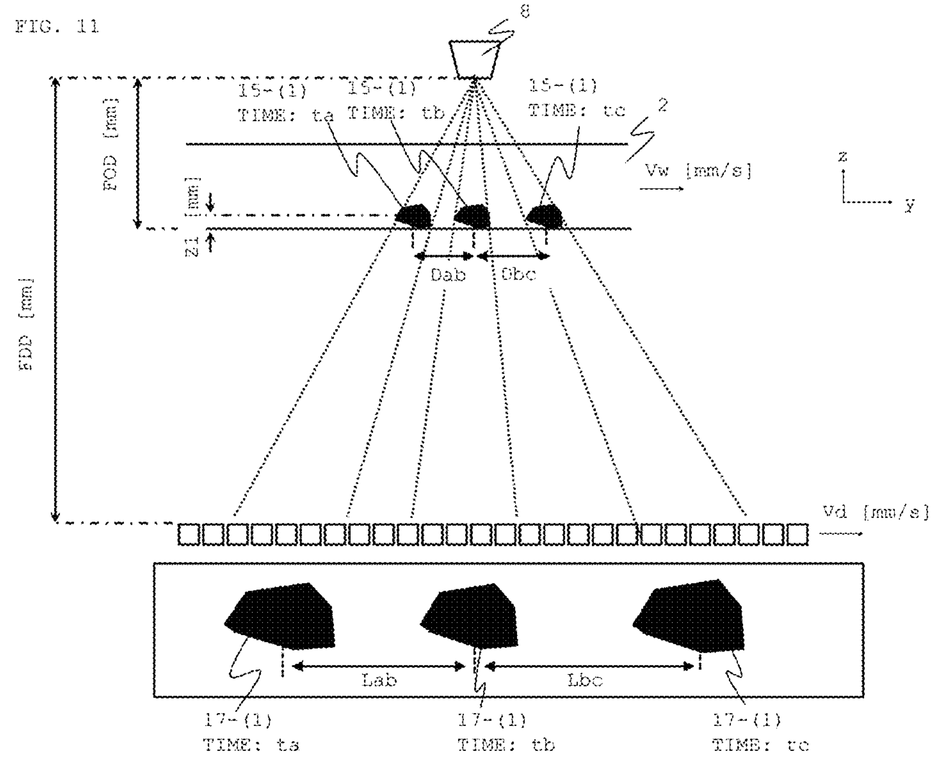
FIG. 11 is a schematic view indicating a projection image of a defect 15-(1) at each time.

For example, a case where defects 15-(1), 15-(2), and 15-(3) of different sizes and shapes are in a certain region in the sample, as shown in FIG. 7, will be described as an example. This is a figure of a coordinate system in which the bottom surface of the sample is the XY plane with Z=0. The center of gravity of the defect 15-(1) is at coordinates (X1, Y1, Z1), the center of gravity of the defect 15-(2) is at coordinates (X2, Y2, Z1), and the center of gravity of 15-(3) is at coordinates (X1, Y1, Z2). An image acquired by the detector when the sample and the detector are conveyed is considered. FIGS. 8 to 10 show examples when imaging is continuously performed while the sample and the detector are moved from left to right in the figure (i.e., in the Y axis direction). FIG. 8 shows the position of the sample at time point ta and an image at that position, FIG. 9 shows the position of the sample at time point tb and an image at that position, and FIG. 10 shows the position of the sample at time point tc and an image at that position. Note that ta<tb<tc. In a two-dimensional projection image 16 obtained at each time point ta, tb, and tc, an image corresponding to the defect 15-(1) is shown as 17-(1), an image corresponding to the defect 15-(2) is shown as 17-(2), and an image corresponding to the defect 15-(3) is shown as 17-(3). As can be understood from FIGS. 8 to 10, the defects 15-(1) and 15-(2) are at the same depth (Z1), and hence the two defects are observed to move while maintaining substantially the same interval in the projection image 16. On the other hand, the defects 15-(1) and 15-(3) are at different depths (Z1 and Z2), so that the apparent speed of movement in the Y direction differs in the projection image 16, and even if the X and Y coordinates are the same, separated images are obtained with the lapse of a certain time. That is, the movement amount in the projection image (projection movement amount) varies depending on the depth of the defect in the sample. To describe this in more detail, FIG. 11 shows the defect 15-(1) and its corresponding image 17-(1) extracted at each time point ta, tb, and tc. The following are assumed: the movement amount Dab [mm] of the defect 15-(1) from time ta to time tb is Vw(tb−ta); the movement amount Dbc [mm] of the defect 15-(1) from time tb to time tc is Vw (tc−tb); the movement amount of the image of the defect from time ta to time tb in the corresponding image is Lab; and the movement amount of the image of the defect from time tb to time tc is Lbc. When Mz1=FDD/(FOD−Z1), which is a magnification factor Mz1 considering the depth in the sample of the defect 15-(1), is used, Lab=Mz1·Dab=Vw (tb−ta)·FDD/(FOD−Z1), Lbc=Mz1·Dbc=Vw(tb−ta)·FDD/(FOD−Z1) are satisfied. That is, it can be understood that the movement amount of the image of the defect varies as the depth of the defect in the sample varies.

Figure 12:
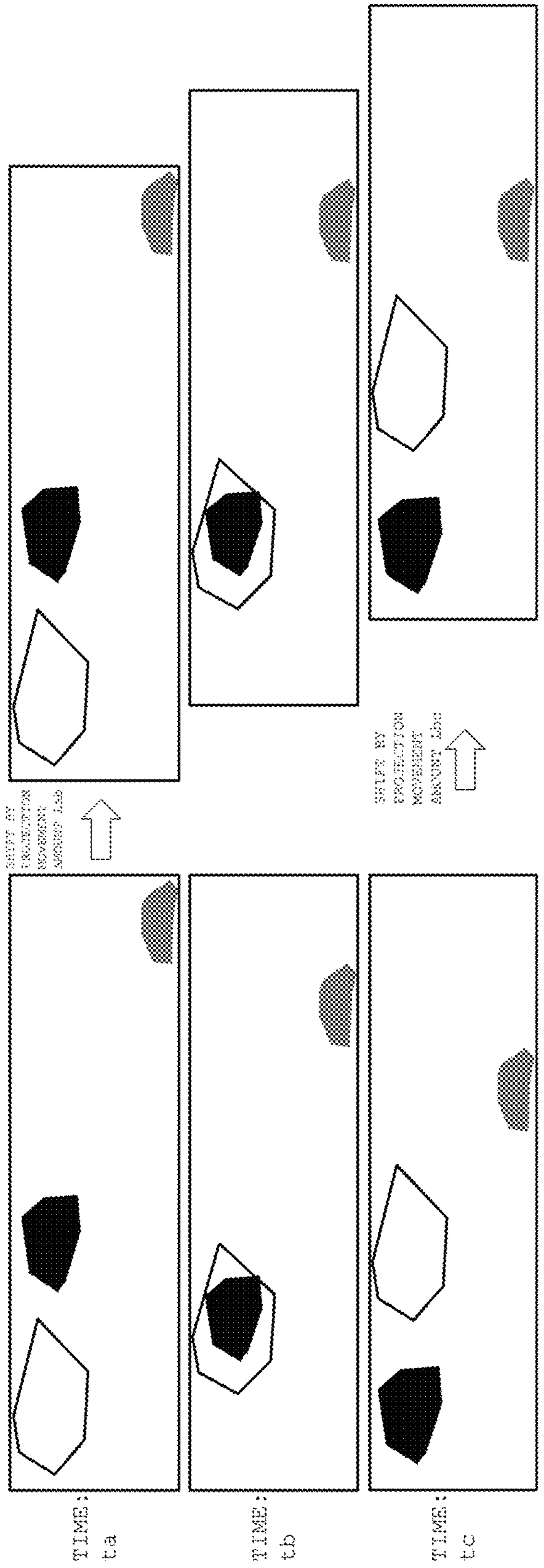
FIG. 12 is a diagram for explaining a step of obtaining a depth at which a defect is present.

As another application method, based on the movement behavior of the images of the plurality of defects, the images at other acquisition times are shifted by the movement amount of the defects and superimposed with the image at a certain time as the center. As a result, images of defects present at a depth of interest overlap each other, making it possible to obtain a large signal intensity and detect even low-contrast defects. Specifically, for example, as shown in FIG. 12, when the image at time point ta (16 in FIG. 8) is shifted by −Lab and the image at time point tc (16 in FIG. 10) is shifted by +Lbc using the movement amounts Lab, Lbc of the images of the defects calculated at the depth Z1 around the image at time point tb (16 in FIG. 9), only the defects present at the depth Z1 can be positioned at substantially the same coordinates. When the images after the shift are superimposed, the defects 15-(1) and 15-(2) present at the depth Z1 overlap each other, resulting in a large signal. On the other hand, the defect 15-(3) not present at the depth Z1 has different coordinates because of the different apparent movement speed and does not have a large signal intensity due to overlap. Therefore, similarly to the above method, when the movement amount of the defect relative to Z2 is calculated, followed by shifting by the movement amount and addition, the positions of the defect 15-(3) present at the depth Z2 can be superimposed, resulting in a large signal intensity. By setting a division number Nz in the sample thickness H and executing the same operation as described above for each ΔZ=H/Nz, defect present at each depth can be extracted. When a plurality of defects overlaps in a line connecting the X-ray and the detector, the defects are detected as one defect, but it is also possible to separate the defects and extract the defects.

<Defect Determination>

Defect candidates are extracted from a composite image obtained by the above image composition method, and a defect is detected using a luminance threshold in a bright direction and a luminance threshold in a dark direction, which can separate the defect candidate from a portion other than the defect candidate. In the detection of the defect candidates, the region satisfying the threshold may be narrowed down by the size of the detection region or may be narrowed down by the feature value of the detection shape. For example, if it is known that the defective foreign matter has an elongated shape in a specific direction due to a certain process, the direction (angle) of the detected shape and its thinness (aspect ratio) may be narrowed down as the feature value. A spatial filter or the like may be used prior to detection at the luminance threshold. The defect determination is performed by these methods.

Examples

Hereinafter, the present invention will be described more specifically with reference to examples, but the present invention is not limited thereto and is not to be construed as being limited to these examples. Materials and devices used in Examples are shown below.

(Inspection Object)

Figure 13:
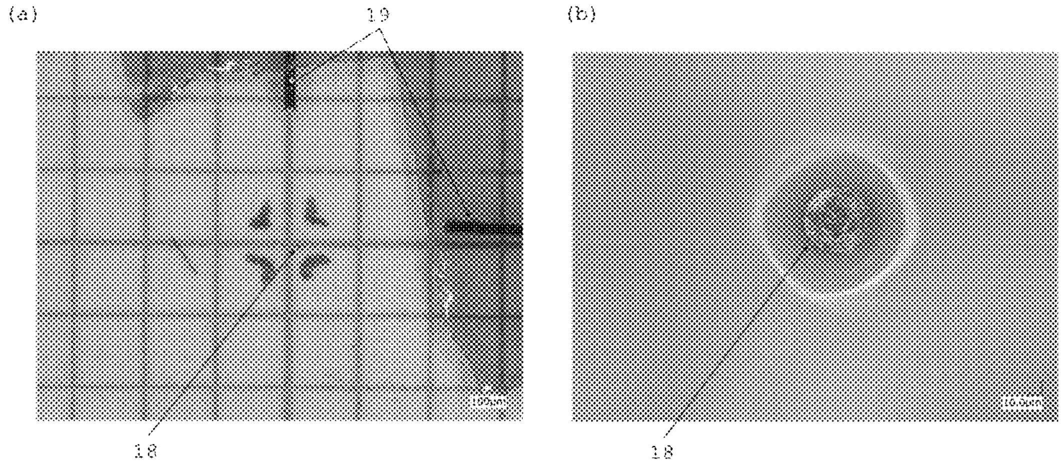
FIG. 13 is an image viewed from the upper surface of an inspection object used for measurement in the section of the embodiment, where FIG. 13(*a*) is an entire image and FIG. 13(*b*) is an enlarged image of the vicinity of a foreign matter equivalent.

A cylinder made of SUS304 with a diameter of 50 μm and a height of 50 μm was bonded as a foreign matter equivalent 18 to a commercially available polyethylene terephthalate film using an epoxy resin, with the bottom surface (or upper surface) as a bonding surface, to obtain an inspection object (manufactured by Toray Precision Co., Ltd.). FIG. 13 shows a top image of the inspection object. Here, in the captured image, two wires (markers 19) made of SUS304 with a diameter of 200 μm were arranged so that the arrangement place of the foreign matter equivalent could be seen.

(Device Configuration, Measurement)

X-ray imaging was performed by installing a commercially available X-ray tube (L9181-02, manufactured by Hamamatsu Photonics K.K.), a commercially available X-ray TDI camera (C12300-121, manufactured by Hamamatsu Photonics K.K.), a commercially available linear stage 1 (LEFB32T-1200-S5C5183, manufactured by SMC Corporation) for conveying an inspection object, and a commercially available linear stage 2 (L40B1150-N2-KM02 X-MCC2-KX14B, manufactured by Zaber Technologies Inc.) for conveying an X-ray TDI camera. The X-ray tube, the X-ray TDI camera, the linear stage 1, and the linear stage 2 were installed so that a distance FDD from the focal point of the X-ray tube to the X-ray TDI camera was 325 mm and a distance FOD from the focal point of the X-ray tube to the inspection object was 95 mm (cf. FIG. 5). Note that the conveyance directions of the linear stage 1 and the linear stage 2 are the same.

Then, the inspection object was placed on the linear stage 1, and the X-ray TDI camera was placed on the linear stage 2. The X-ray tube was irradiated with X-rays at a tube voltage of 40 kV and a tube current of 75 μA. With a movement speed Vw of the linear stage 1 and a movement speed Vd of the linear stage 2 under conditions described in Table 1, the respective stages were operated and images were captured by an X-ray TDI camera.

(Image Evaluation)

In the image captured by the above device, a minimum luminance So of a portion where the foreign matter equivalent was captured, an average luminance Sb of a portion where the foreign matter equivalent was not captured, and a standard deviation σb of the luminance of the portion where the foreign matter equivalent was not captured were measured. Note that Sb and σb were measured from arbitrarily selected 400 pixels in the image, excluding the place where the foreign matter equivalent was placed and its vicinity (20 pixels square (approximately 280 μm×280 μm in this example). The luminance was captured by an X-ray TDI camera, and the amount of signal of the output X-ray image was used. Table 1 shows the results for the contrast-to-noise ratio (CNR), which is a value obtained by dividing the contrast C, the absolute value of the difference between So and Sb, by σb. A higher value of CNR indicates that the signal intensity contrast of the inspection object is greater than the noise in the portion without the inspection object and is easier to detect.

TABLE 1

Figure 14:
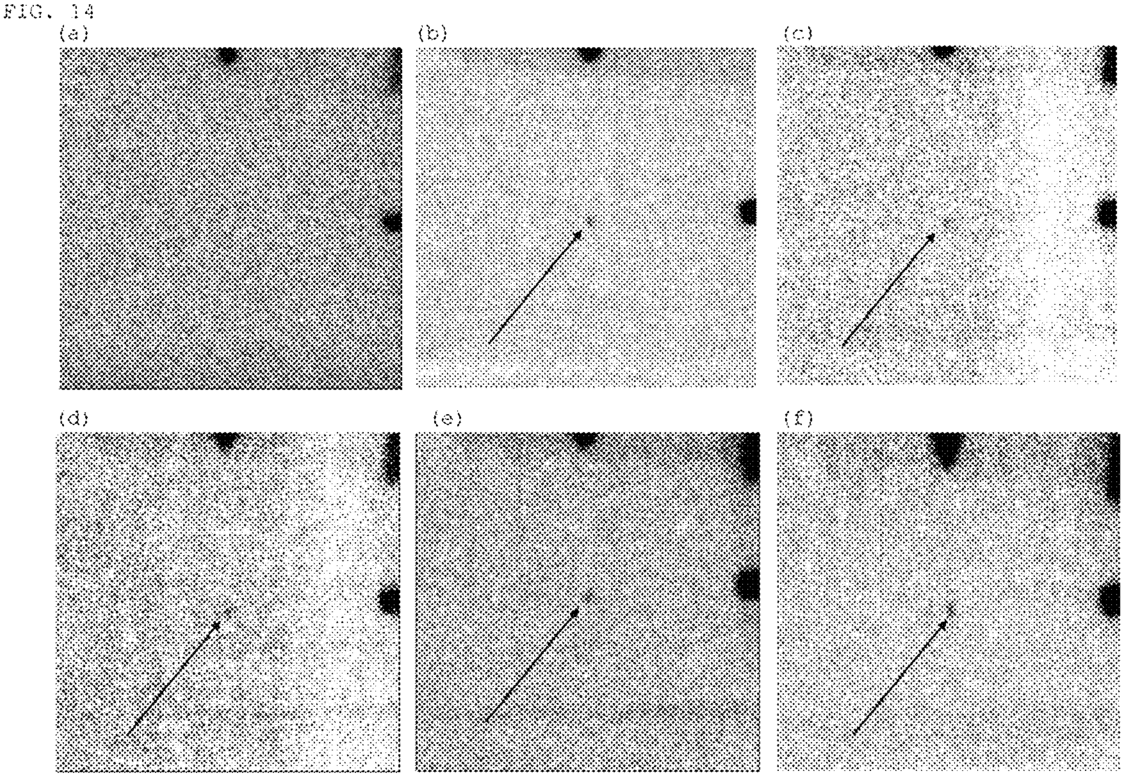
FIG. 14 is an image of the vicinity of a foreign matter equivalent in the inspection object captured by an X-ray time delay integration (TDI) camera, where a black dot pointed to by an arrow indicates an image of the foreign matter equivalent.

| | | | | | | |
|---|---|---|---|---|---|---|
| Sample conveyance speed Vw [m/min] | 3 | 3 | 3 | 3 | 4.5 | 10 |
| Detector movement speed Vd [m/min] | 0 | 9.36 | 15.36 | 20.52 | 15.36 | 33.18 |
| Vd/Vw | 0 | 3.12 | 5.12 | 6.84 | 3.41 | 3.32 |
| $\frac{(Vd/Vw)}{(FDD/FOD)}$ | 0.00 | 0.91 | 1.50 | 2.00 | 1.00 | 0.97 |
| X-ray image | FIG. 14 (a) | FIG. 14 (b) | FIG. 14 (c) | FIG. 14 (d) | FIG. 14 (e) | FIG. 14 (f) |
| CNR value | 0 | 4.6 | 2.4 | 2.2 | 4.4 | 4.3 |

INDUSTRIAL APPLICABILITY

According to the present invention, since the transmission image is acquired while the detector is moved in the same direction as the movement direction of the sample, a projection image with high temporal resolution can be obtained even with a detector at a low scan rate. Images captured at various irradiation angles from the point light source are acquired at a plurality of positions, whereby even when a plurality of defects overlaps in a linear shape connecting the radiation source and the detector, the defects can be separated and extracted. Furthermore, even a low-contrast defect can be inspected as a large signal from a plurality of images at high speed and with high accuracy.

DESCRIPTION OF REFERENCE SIGNS

1: Housing
2, 2 (*a*), 2 (*b*): Sample
3: Carry-in port
4: Carry-out port
5: Sample conveyance roll
6: Sample conveyance belt
7: Thickness measurement sensor
8: Radiation source
9: Radiation
10: Detector
11: Detector pixel
12: Detector conveyance belt
13: Driving means of movement mechanism
14: Flexible detector
15-(1), 15-(2), 15-(3): Defect present in sample
16: Projection image
17-(1), 17-(2), 17-(3): Image of defects present in the sample
18: Foreign matter equivalent (cylinder made of SUS304)
19: Marker (wire made of SUS304)

The invention claimed is:

1. An inspection device comprising at least:

a conveyance mechanism that conveys a sample to be inspected;

a radiation source that radially irradiates a region through which the sample passes with radiation;

a detector that is disposed to be able to detect radiation transmitted through the sample and converts the detected radiation into an electrical signal; and a movement mechanism that moves the detector along a direction in which the sample is conveyed by the conveyance mechanism, wherein the inspection device is configured to determine presence or absence of a defect in the sample based on image information on the sample from the detector obtained during a period when the sample passes through the region, and based on movement information on the sample from the conveyance mechanism, and wherein the conveyance mechanism and the movement mechanism move the sample and the detector such that a ratio Vd/Vw of Vd to Vw is twice or less than a ratio (FDD/FOD) of a distance (FDD) between the radiation source and the detector to a distance (FOD) between the radiation source and the sample, where Vw represents a speed of movement of the sample by the conveyance mechanism, and Vd represents a speed component of movement of the detector by the movement mechanism in a same direction as a movement direction of the sample.

2. The inspection device according to claim 1, further comprising:

a thickness measuring instrument that measures a thickness of a sample, wherein a position of a defect in the sample is calculated based on thickness information on the sample measured by the thickness measuring instrument and image information on the sample from the detector.

3. The inspection device according to claim 1, wherein a plurality of the detectors is arranged along a conveyance direction of the sample.

4. The inspection device according to claim 1, wherein the movement mechanism includes an endless annular conveyance belt, and the movement mechanism is configured to apply a driving force to the conveyance belt, assist smooth movement of the conveyance belt, and absorb a tensile force and a compressive force generated in a conveyance body accompanying movement of the conveyance belt.

5. The inspection device according to claim 1, wherein the detector is a flexible detector having bendable flexibility, and the detector is disposed along a movement direction of the movement mechanism.

6. The inspection device according to claim 1, wherein the radiation is an electromagnetic wave.

7. The inspection device according to claim 1, wherein the detector is an indirect conversion type detector including a scintillator panel having a pixel structure in which each of spaces divided by grid-shaped partition walls formed on a base material is filled with a phosphor that emits light through radiation, and a photoelectric conversion element that has a cell structure corresponding to the division and photoelectrically converts light emitted from the phosphor.

8. A method for inspecting presence or absence of a defect inherent in a sample, the method comprising:

allowing, by a conveyance mechanism, the sample to be inspected to pass through a region irradiated with radiation from a radiation source that performs radial irradiation with radiation, detecting, by a detector, a radiation and converting the radiation into an electronic signal while moving the detector along a direction in which the sample is conveyed by the conveyance mechanism, the radiation having been transmitted through the sample passing through the region, the detector being included in a movement mechanism and disposed to be able to detect the radiation and converting the detected radiation into an electrical signal; and determining presence or absence of a defect in the sample based on image information on the sample from the detector obtained during a period when the sample passes through the region and based on movement information on the sample from the conveyance mechanism, wherein the sample and the detector are moved by the conveyance mechanism and movement mechanism such that a ratio Vd/Vw of Vd to Vw is twice or less than a ratio (FDD/FOD) of a distance (FDD) between the radiation source and the detector to a distance (FOD) between the radiation source and the sample, where Vw represents a speed of movement of the sample by the conveyance mechanism, and Vd represents a speed component of movement of the detector by the movement mechanism in a same direction as a movement direction of the sample.

9. The inspection method according to claim 8, further comprising measuring a thickness of the sample and calculating a position of a defect in the sample based on the measured thickness information and the image information on the sample from the detector.

10. The inspection method according to claim 8, wherein a plurality of the detectors is arranged along a conveyance direction of the sample.

11. The inspection method according to claim 8, wherein the movement mechanism includes an endless annular conveyance belt, and the movement mechanism is configured to apply a driving force to the conveyance belt, assist smooth movement of the conveyance belt, and absorb a tensile force and a compressive force generated in a conveyance body accompanying movement of the conveyance belt.

12. The inspection method according to claim 8, wherein the radiation is an electromagnetic wave.

13. The inspection method according to claim 8, wherein the detector is an indirect conversion type detector including a scintillator panel having a pixel structure in which each of spaces divided by grid-shaped partition walls formed on a base material is filled with a phosphor that emits light through radiation, and a photoelectric conversion element that has a cell structure corresponding to the division and photoelectrically converts light emitted from the phosphor.

* * * * *